US008521681B2

(12) United States Patent
Ouchi et al.

(10) Patent No.: US 8,521,681 B2
(45) Date of Patent: Aug. 27, 2013

(54) APPARATUS AND METHOD FOR RECOGNIZING A CONTEXT OF AN OBJECT

(75) Inventors: Kazushige Ouchi, Saitama-ken (JP);
Miwako Doi, Kanagawa-ken (JP);
Kazunori Imoto, Kanagawa-ken (JP);
Masaaki Kikuchi, Kanagawa-ken (JP);
Rika Hosaka, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 789 days.

(21) Appl. No.: 12/708,818

(22) Filed: Feb. 19, 2010

(65) Prior Publication Data

US 2010/0217588 A1 Aug. 26, 2010

(30) Foreign Application Priority Data

Feb. 20, 2009 (JP) ................................. 2009-038204

(51) Int. Cl.
*G06F 15/00* (2006.01)
*G06F 15/18* (2006.01)

(52) U.S. Cl.
USPC ............................................. 706/62; 706/12

(58) Field of Classification Search
USPC ...................................................... 706/12, 62
See application file for complete search history.

(56) References Cited

U.S. PATENT DOCUMENTS

| 2008/0318562 A1* | 12/2008 | Featherstone et al. ........ 455/418 |
| 2010/0001857 A1 | 1/2010 | Doi et al. |
| 2010/0005045 A1 | 1/2010 | Hiraoka et al. |

FOREIGN PATENT DOCUMENTS

| JP | 3-6426 A | 1/1991 |
| JP | 10-113343 A | 5/1998 |
| JP | 11-117875 A | 4/1999 |
| JP | 2000-317002 A | 11/2000 |
| JP | 2002-323371 | 11/2002 |
| JP | 2004-283959 A | 10/2004 |
| JP | 2005-238396 A | 9/2005 |
| JP | 2005-341543 A | 12/2005 |
| JP | 2006-346768 A | 12/2006 |
| JP | 2007-166472 A | 6/2007 |
| WO | WO 2008/126347 A1 | 10/2008 |

OTHER PUBLICATIONS

J. Scott and B. Dragovic, "Audio Location: Accurate Low-Cost Location Sensing", Pervasive 2005, LNCS 3468, pp. 1-18, 2005.*
J.S. Hu et al "Robust Speakers Location Detection in a Vehicle Environment Using GMM Models", Systems, Man, and Cybernetics, IEEE Trans. on, vol. 36, No. 2, Apr. 2006, pp. 403-412.*
B. Toreyin et al., "HMM Based Falling Person Detection Using Both Audio and Video", HCI/ICCV 2005, pp. 211-220.*

(Continued)

*Primary Examiner* — Kakali Chaki
*Assistant Examiner* — Vincent Gonzales
(74) *Attorney, Agent, or Firm* — Oblon, Spivak, McClelland, Maier & Neustadt, L.L.P.

(57) ABSTRACT

Moving information of an object is input, and first sound information around the object is input. A motion status of the object is recognized based on the moving information. Second sound information is selectively extracted from the first sound information, based on the motion status. A first feature quantity is extracted from the second sound information. A plurality of models is stored in a memory. Each model has a second feature quantity and a corresponding specified context. The second feature quantity is previously extracted by the second extraction unit before the first feature quantity is extracted. A present context of the object is decided based on the specified context corresponding to the second feature quantity most similar to the first feature quantity. The present context of the object is output.

9 Claims, 11 Drawing Sheets

(56) References Cited

OTHER PUBLICATIONS

Japanese Office Action issued Sep. 4, 2012 in Patent Application No. 2009-038204 with English Translation.

Vesa Peltonen, et al., "Computational Auditory Scene Recognition," Proc. of ICASSP2002, 2002, 4 pages.

C. Clavel, et al., "Events Detection for An Audio-Based Surveillance System," Proc. of ICME2005, 2005, 4 pages.

* cited by examiner

```
<DATA SET>
  <APPARATUS NAME> APPARATUS 1 </APPARATUS
    NAME>
  <OPERATING>
    <FEATURE QUANTITY>
      <TYPE> FREQUENCY </TYPE>
      <UNIT> Hz </UNIT>
      <NUMERIC 1> 1000 </NUMERIC 1>
      <NUMERIC 2> 397 </NUMERIC 2>
      <NUMERIC 1> 1200 </NUMERIC 1>
      <NUMERIC 2> 324 </NUMERIC 2>
      <NUMERIC 1> 850 </NUMERIC 1>
      <NUMERIC 2> 248 </NUMERIC 2>
      ...
    </FEATURE QUANTITY>
  </OPERATING>
  <NON-OPERATING>
    ...
  </NON-OPERATING>
</DATA SET>
```

FIG. 14

APPARATUS AND METHOD FOR RECOGNIZING A CONTEXT OF AN OBJECT

CROSS-REFERENCE TO RELATED APPLICATIONS

This application is based upon and claims the benefit of priority from Japanese Patent Application No. 2009-38204, filed on Feb. 20, 2009; the entire contents of which are incorporated herein by reference.

FIELD OF THE INVENTION

The present invention relates to an apparatus and a method for recognizing a context of an object based on sound information around the object.

BACKGROUND OF THE INVENTION

With miniaturization and power consumption lowering of each sensor, and development of processing technique of a sensor signal, a situational application to supply a suitable service based on an object's context (For example, location information of the object) is taken notice. As the situational application, for example, an application for special use to supply a patrolman in a factory with an operation-support, or an application for general use to supply a user having a cellular-phone with a daily life-support (For example, distribution of weather forecast), are considered. In order to improve a quality of the situational application, it is important to exactly recognize an object's context.

As one method for acquiring the object's location information, GPS is well known. However, when the object goes into a building, location-measurement by GPS is difficult. For example, in order to improve a quality of the application to supply the patrolman with the operation support, it is desired to utilize location information of the object (a terminal carried with the patrolman) indoors (in the factory).

Accordingly, as a method for acquiring the object's location information indoors, location-measurement based on a beacon (radio, ultrasonic) transmitted from an equipment (set indoors) or an intensity of radio electric wave, can be considered. However, as to location-measurement based on the beacon or the intensity of radio electric wave, an influence of shielding and reflection is large, and a cost to install the equipment increases. Furthermore, a method for acquiring the object's location information indoors using RFID technique can be also considered. However, as to a passive type RFID, a communicatable distance is relatively short, and a user's active operation is necessary to acquire the object's location information. On the other hand, as to an active type RFID, influence of a dead angle and a multi-path is large, and a cost to install the equipment more increases in comparison with the passive type RFID.

Furthermore, a method for recognizing the object's context using sound information is also proposed. Concretely, sound information around the object is acquired using a microphone. By comparing a feature quantity of the sound information with a feature quantity corresponding to a specified context, the object's context is estimated. This technique is disclosed in JP-A 2002-323371 (Kokai), V. Peltonen et al., "Computational Auditory Scene Recognition", Proc. of ICASSP2002, pp. 1941-1944, 2002, and C. Clavel et al., "Events Detection for An Audio-Based Surveillance System", Proc. of ICME2005, pp. 1306-1309, 2005.

In above-mentioned recognition of the object's context based on sound information, the sound information need be analyzed to compare the feature quantity. In this case, how to determine the sound information as an analysis object is a problem. In a conventional technology, a method for indicating the analysis object by the user's active operation (such as a button operation), and a method for constantly analyzing (Briefly, all sound information is indicated as the analysis object), are selectively used.

As to the method for indicating the analysis object by the user's active operation, it is effective to save a calculation quantity (for analysis processing) and a power consumption. However, its operability has a problem. On the other hand, as to the method for constantly analyzing, the user's burden for operation is small. However, the calculation quantity and the power consumption are large, which is a special problem in case that the object is a handheld mobile computer not having the calculation quantity and the power consumption to spare. Furthermore, in a period when the object is moving, a noise accompanied with the moving is apt to be mixed into the sound information. Accordingly, it is feared that accuracy of context recognition drops.

SUMMARY OF THE INVENTION

The present invention is directed to an apparatus and a method for correctly recognizing a context of an object with low power consumption and low calculation quantity.

According to an aspect of the present invention, there is provided an apparatus for recognizing a context of an object, comprising: a first input unit configured to input moving information of an object; a second input unit configured to input first sound information around the object; a recognition unit configured to recognize a motion status of the object based on the moving information; a first extraction unit configured to selectively extract second sound information from the first sound information, based on the motion status; a second extraction unit configured to extract a first feature quantity from the second sound information; a storage unit configured to store a plurality of models, each model having a second feature quantity and a corresponding specified context, the second feature quantity being extracted by the second extraction unit before the first feature quantity is extracted; a decision unit configured to decide that the specified context corresponding to the second feature quantity most similar to the first feature quantity is a present context of the object; and an output unit configured to output the present context.

BRIEF DESCRIPTION OF THE DRAWINGS

FIG. 14 is an exemplary identification model stored in an identification model storage unit of FIG. 1.

DETAILED DESCRIPTION OF THE EMBODIMENTS

Figure 1:
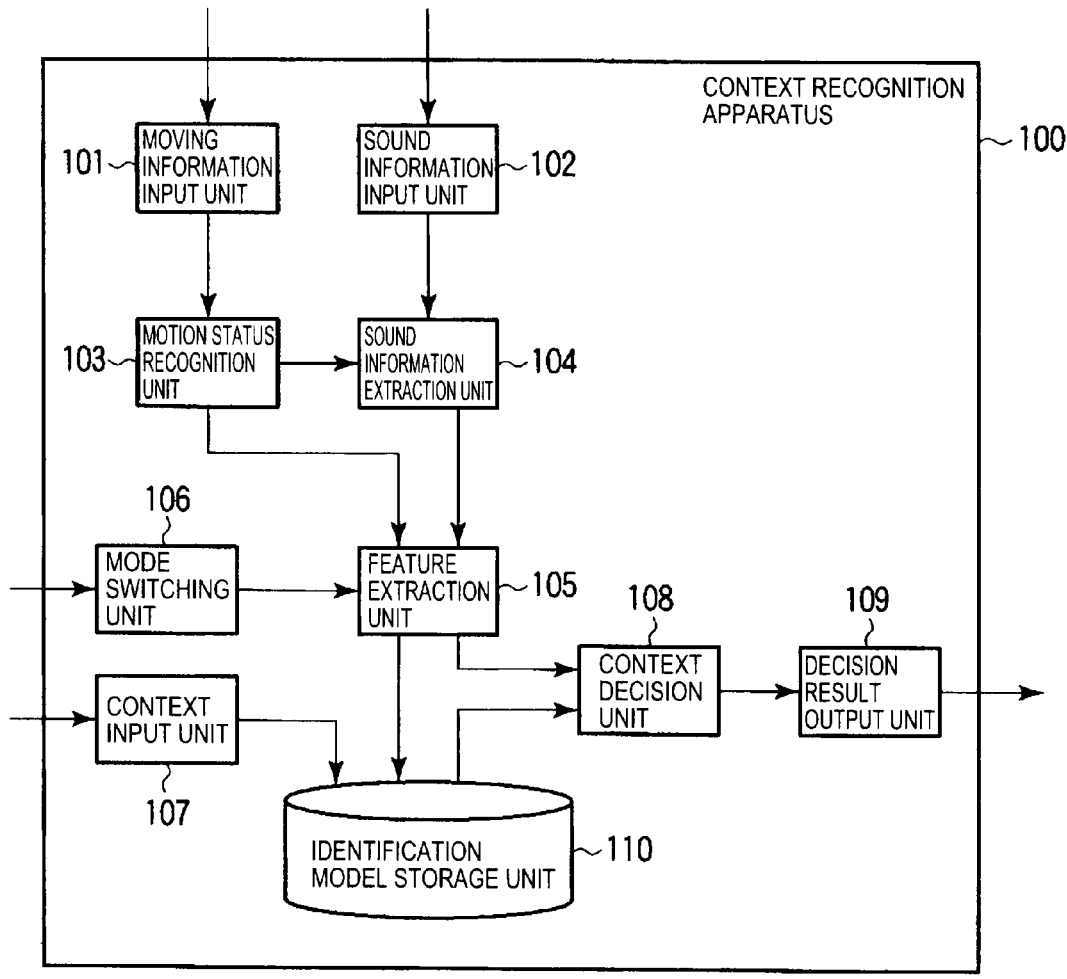
FIG. 1 is a block diagram of a context recognition apparatus according to a first embodiment.

Hereinafter, embodiments of the present invention will be explained by referring to the drawings. The present invention is not limited to the following embodiments.

The First Embodiment

As shown in FIG. 1, the context recognition apparatus 100 of the first embodiment includes a moving information input unit 101, a sound information input unit 102, a motion status recognition unit 103, a sound information extraction unit 104, a feature extraction unit 105, a mode switching unit 106, a context input unit 107, a context decision unit 108, a decision result output unit 109, and an identification model storage unit 110.

Figure 2:
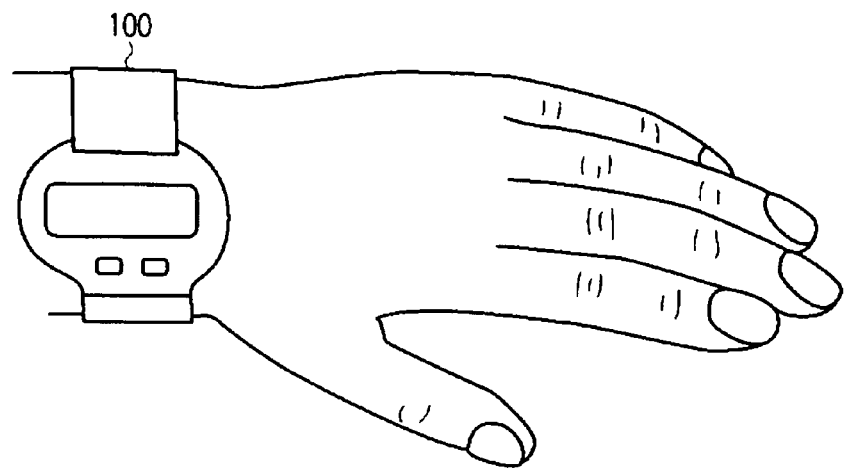
FIG. 2 is an exemplary first packaging of the context recognition apparatus of FIG. 1.
Figure 3:
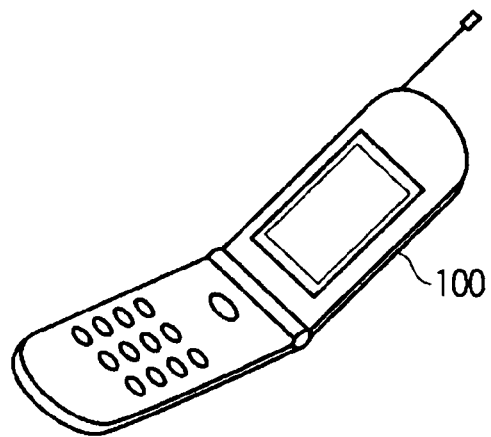
FIG. 3 is an exemplary second packaging of the context recognition apparatus of FIG. 1.
Figure 4:
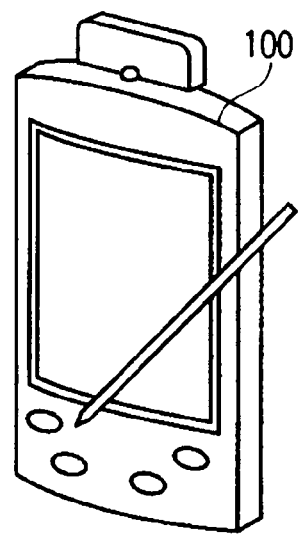
FIG. 4 is an exemplary third packaging of the context recognition apparatus of FIG. 1.

For example, the context recognition apparatus 100 may be packaged as a wristwatch type apparatus for exclusive use as shown in FIG. 2, as one function of a cellular-phone as shown in FIG. 3, or as one function of PDA as shown in FIG. 4. The context recognition apparatus 100 is carried with a user without regard to the mode. If the context recognition apparatus 100 is packaged as the wristwatch type apparatus as shown in FIG. 2, a user wears it on his/her wrist. If the context recognition apparatus 100 is packaged as one function of a handheld mobile computer as shown in FIGS. 3 and 4, the user may put the handheld mobile computer into a pocket or a baggage, or may hold in his/her hand directly.

Figure 6:
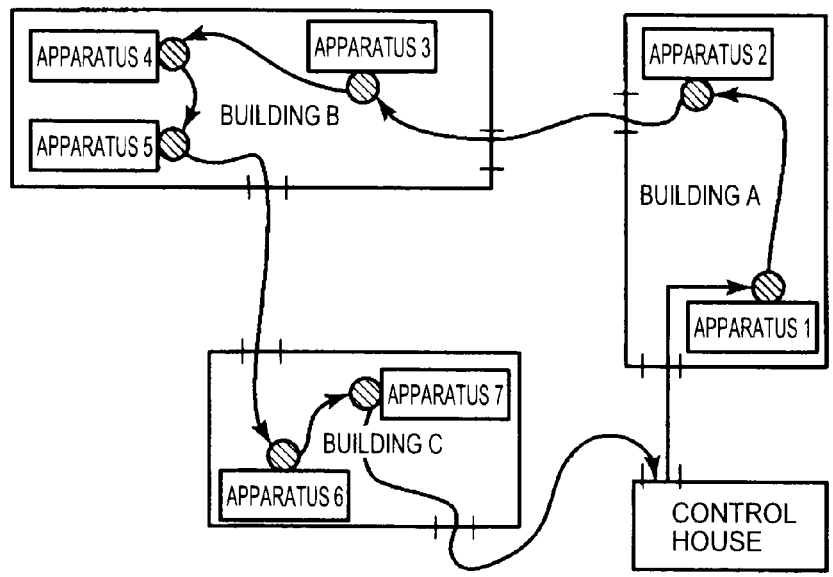
FIG. 6 is an exemplary usage of the context recognition apparatus of FIG. 1.

A usage mode of the context recognition apparatus 100 is not specially limited. For example, it is used to support an apparatus-inspection operation or a safety-control operation in a factory. Concretely, as shown in FIG. 6, a usage situation may be assumed, i.e., a user starts from a control house, executes predetermined inspection operation in a fixed order for apparatuses 1~7 located in buildings A-C, and returns to the control house. Briefly, the context recognition apparatus 100 recognizes any of apparatuses 1~7 where the user executes the inspection operation (More correctly, the context recognition apparatus 100 is located adjacent to any of apparatuses 1~7), and presents a suitable operation screen or a speech announce. Furthermore, the context recognition apparatus 100 informs location information of the user (carrying the context recognition apparatus 100) to the outside to support the safety-control operation.

The moving information input unit 101 is, for example, composed by a moving sensor such as an accelerometer sensor or an angular velocity. The moving information input unit 101 acquires acceleration information or angular velocity information as moving information of the context recognition apparatus 100. As mentioned-above, the context recognition apparatus 100 is carried with the user. Accordingly, the moving information is reflected in the user's moving. The moving information input unit 101 inputs moving information to the motion status recognition unit 103. In following explanation, the moving information is three-axis acceleration. However, the moving information may be an angular velocity, an acceleration except for the three-axis acceleration (For example, a one-axis acceleration or a two-axis acceleration), or combination thereof. Furthermore, a sampling period of the moving information by the moving information input unit 101 is arbitrary, for example, 50 [ms].

The sound information input unit 102 is, for example, a sound sensor such as a microphone. The sound information input unit 102 acquires sound information around the context recognition apparatus 100. If the sound information input unit 102 has a component to be electrically driven, a power supply may be stopped/restarted by operation of the sound information extraction unit 104 (explained afterwards). The sound information input unit 102 inputs sound information to the sound information extraction unit 104.

The motion status recognition unit 103 recognizes a user's motion status carrying the context recognition apparatus 100, based on the moving information from the moving information input unit 101. The motion status recognizable by the motion status recognition unit 103 includes at least a still status and a moving status. However, the motion status may include various motion status such as a walking status, a running status, and a moving status on traffic facilities (on a vehicle, a bicycle, or an electric car). When the motion status recognition unit 103 recognizes a motion status (For example, still status) suitable for analysis of sound information, the motion status recognition unit 103 makes the sound information extraction unit 104 start to operate.

Figure 7:
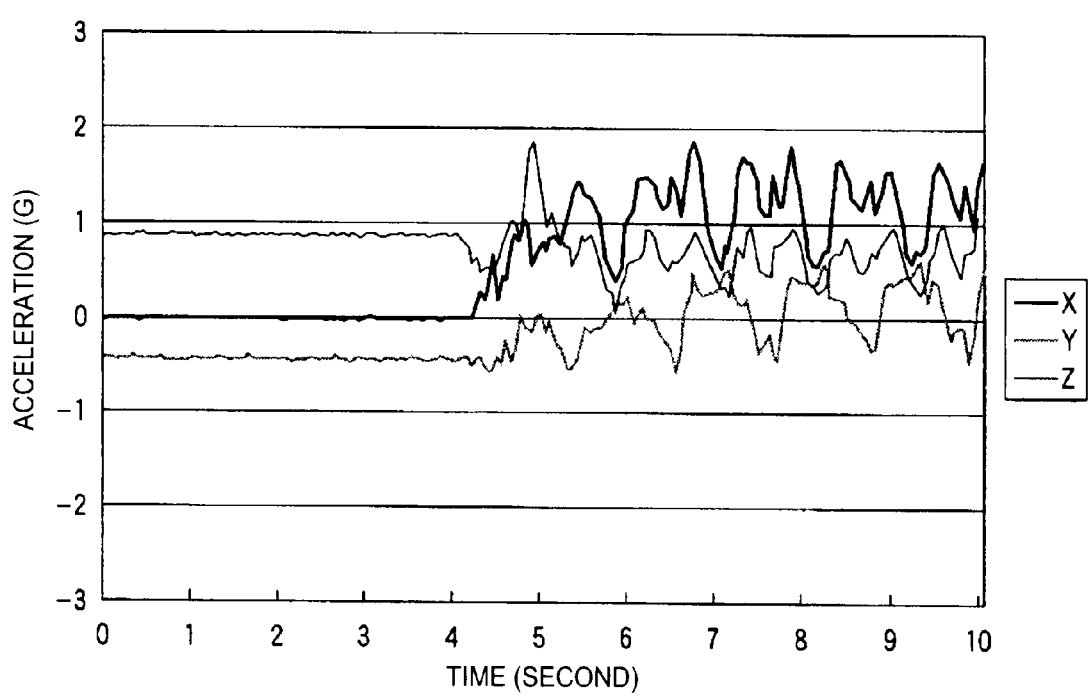
FIG. 7 is an exemplary graph showing acceleration input by a moving information input unit of FIG. 1.
Figure 8:
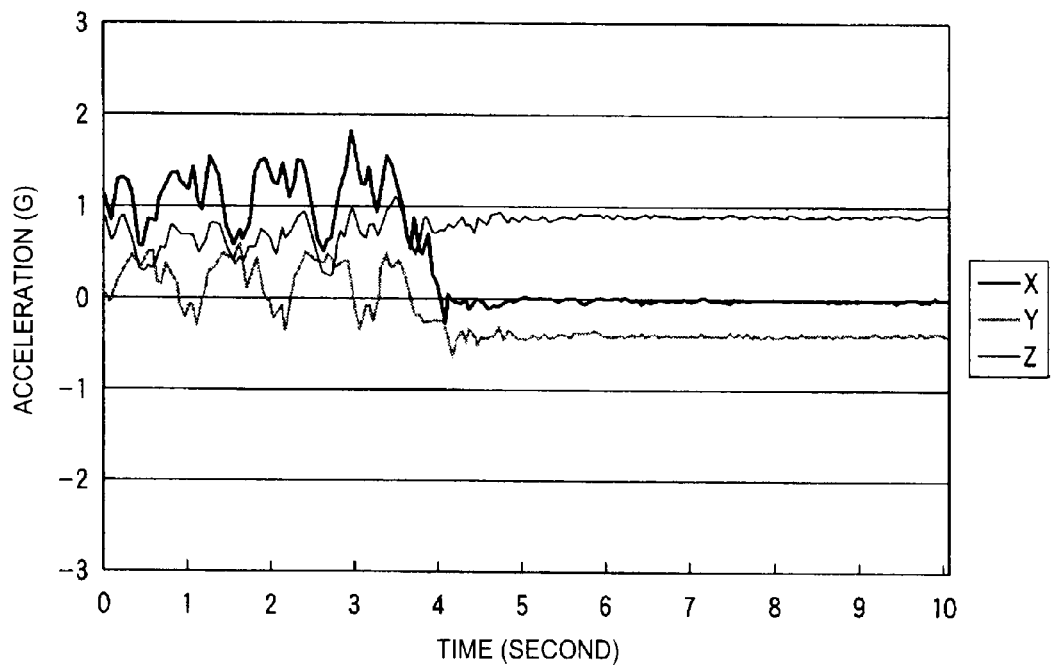
FIG. 8 is another exemplary graph showing acceleration input by a moving information input unit of FIG. 1.

Hereinafter, motion recognition technique usable by the motion state recognition unit 103 is explained. For example, moving information (three-axis acceleration data) input to the moving information input unit 101 is shown in FIGS. 7 and 8. Concretely, FIG. 7 shows moving information acquired when a user starts walking from a still state, i.e., when the motion state transits from the still state to a moving state. FIG. 8 shows moving information acquired when the user stops walking and stands still, i.e., when the motion state transits from the moving state to the still state. By summarizing FIGS. 7 and 8, change of the acceleration acquired during the still state is small, and change of the acceleration acquired during the moving state is large.

Figure 9:
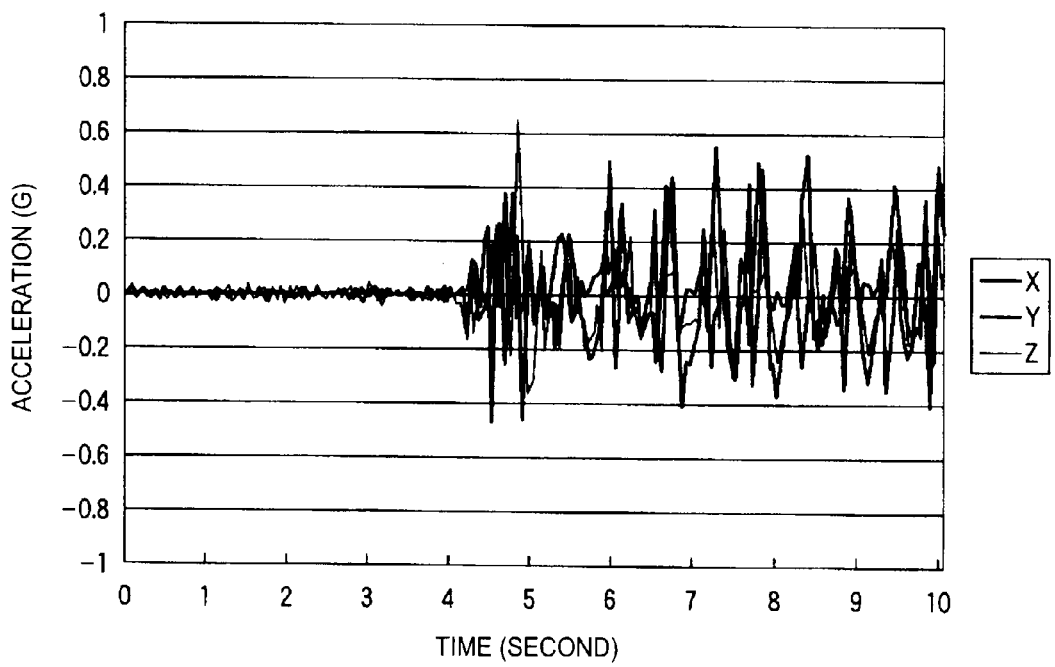
FIG. 9 is a graph showing a differential acceleration based on the acceleration of FIG. 7.
Figure 10:
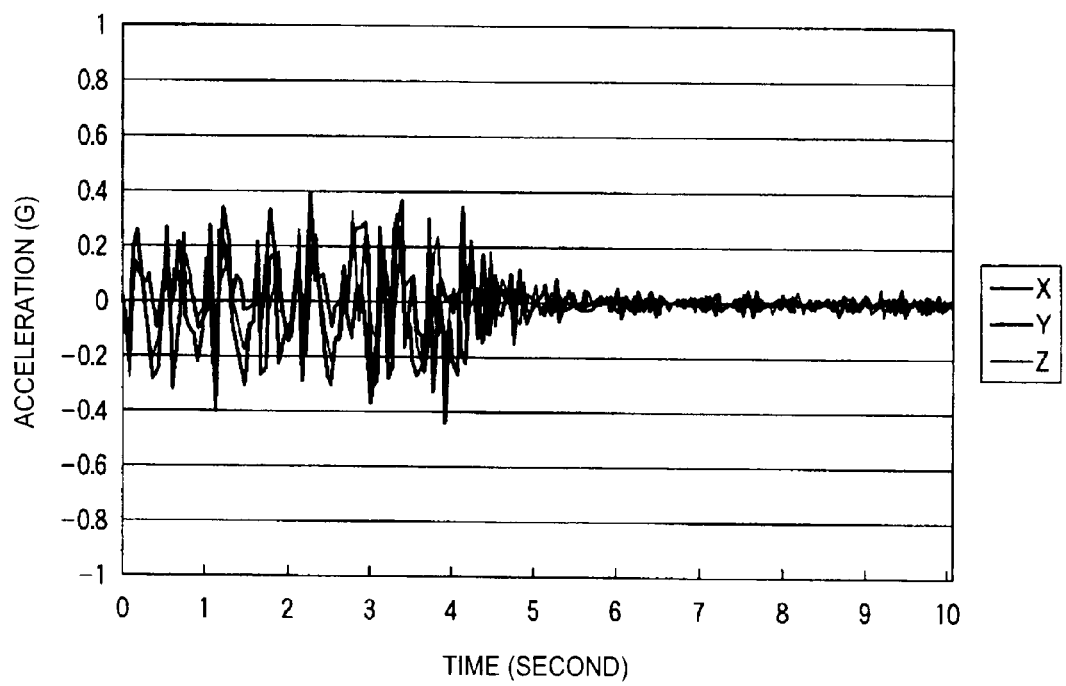
FIG. 10 is a graph showing a differential acceleration based on the acceleration of FIG. 8.

As to a first method for recognizing the motion state, an original waveform or a differential waveform is utilized. By differentiating the original waveform of acceleration in FIGS. 7 and 8 (Actually, from an acceleration corresponding to each data point, an acceleration corresponding to temporally a previous data point is subtracted), a differential waveform of acceleration in FIGS. 9 and 10 is respectively acquired (Actually, a plurality of values equal to a differential acceleration corresponding to each data point). In the first method, a fact that change of acceleration during the still state is small is used. For example, a threshold is set to an absolute value of differential acceleration equal to or larger than one-axis. When the absolute value of differential acceleration above the threshold is acquired in a predetermined period, a motion status in the predetermined period is recognized as a moving status. When the absolute value of differential acceleration above the threshold is not acquired, a motion status in the predetermined period is recognized as a still status. Furthermore, the same threshold processing can be subjected to not the differential acceleration but an absolute value of acceleration. However, in case of subjecting the threshold processing to the absolute value of acceleration (especially, Z-axis acceleration), effect of gravity acceleration need be taken into consideration.

As to a second method for recognizing the motion state, scalar of acceleration is utilized. Concretely, by operation described in next equation (1), scalar A of three-axis acceleration is acquired.

$$A=\sqrt{(X_n-X_{n-1})^2+(Y_n-Y_{n-1})^2+(Z_n-Z_{n-1})^2} \quad (1)$$

Figure 11:
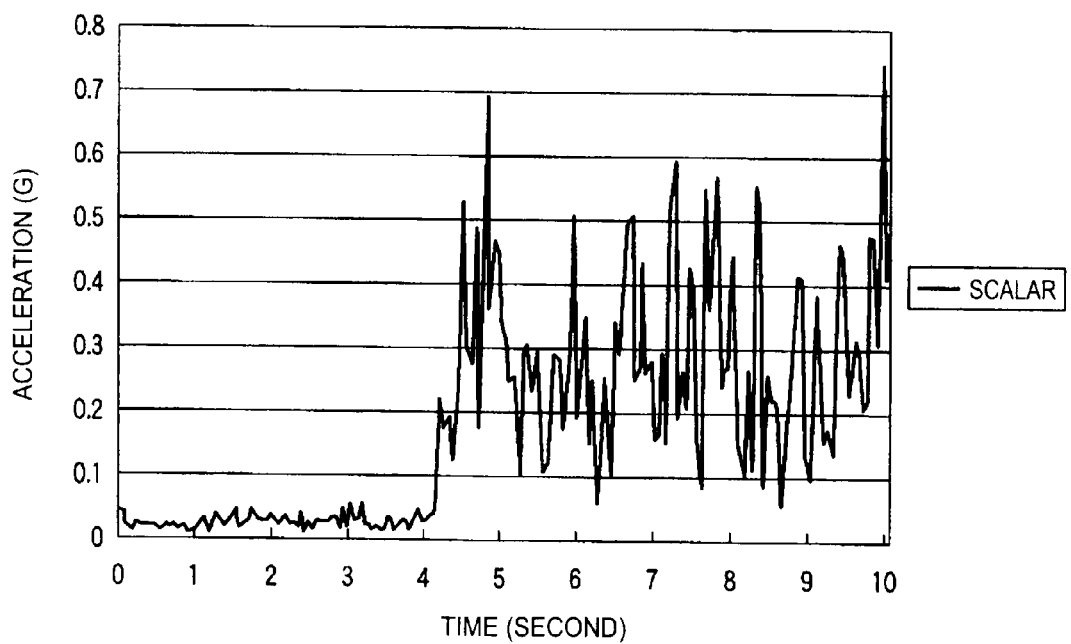
FIG. 11 is a graph showing a scalar based on the acceleration of FIG. 7.
Figure 12:
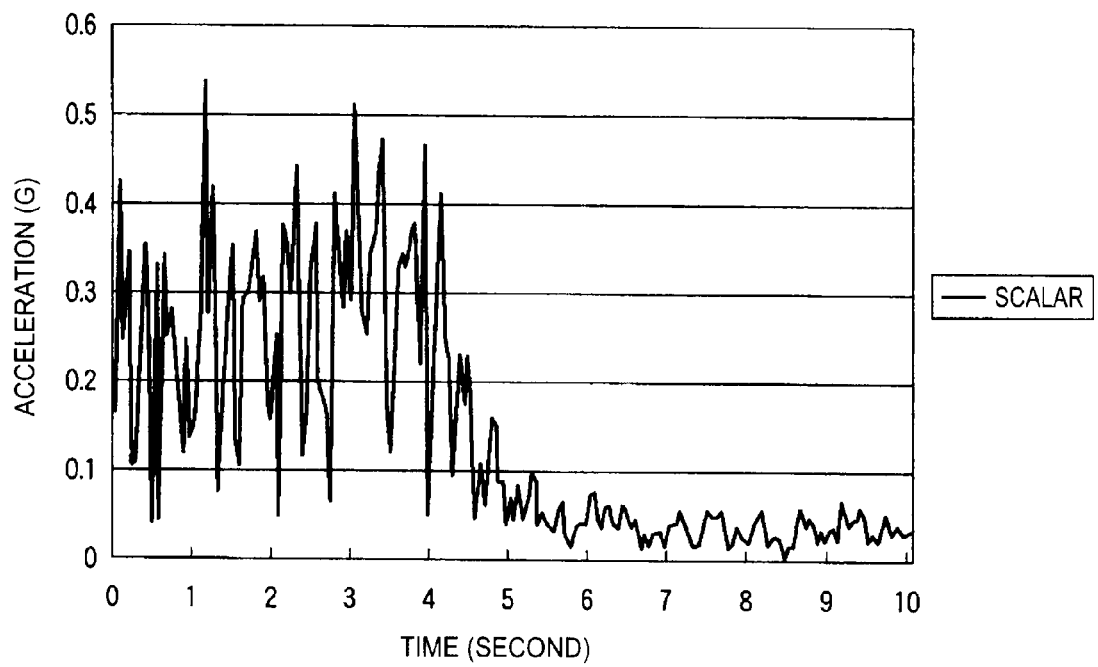
FIG. 12 is a graph showing a scalar based on the acceleration of FIG. 8.

In the equation (1), $X_n$, $Y_n$, and $Z_n$ respectively represent X-axis acceleration, Y-axis acceleration and Z-axis acceleration at arbitrary data point n. $X_{n-1}$ $Y_{n-1}$ and $Z_{n-1}$ respectively represent X-axis acceleration, Y-axis acceleration and Z-axis acceleration at a previous data point n−1 (immediately before the data point n). By subjecting operation of the equation (1) to acceleration data of FIGS. 7 and 8, scalar of acceleration of FIGS. 11 and 12 is respectively acquired. In the second method, a fact that scalar A of acceleration during the still state is small is used. For example, a threshold is set to a scalar A of acceleration. When the scalar A above the threshold is acquired in a predetermined period, a motion status in the predetermined period is recognized as a moving status. When the scalar A above the threshold is not acquired, a motion status in the predetermined period is recognized as a still status.

Furthermore, an existing method for recognizing a motion disclosed in following references can be applied.

K. Ouchi et al., "Lifeminder: A wearable healthcare support system with timely instruction based on the user's context", IEICE Transactions on Information and Systems, Vol. E87-D, No. 6, pp. 1361-1369, 2004

T. Iso et al., "Gait Analyzer based on a Cell Phone with a Single Three-Axis Accelerometer, Proceedings of Mobile HCI' 06, pp. 141-144, 2006

N. Iketani et al., "Pedestrian Context Interface Using a Three-Axis Accelerometer", Technical Report of Information Processing Society of Japan, 2008-UBI-19 (14), pp. 75-80, 2008

The sound information extraction unit 104 starts operating when the motion status recognition unit 103 recognizes a still state. Concretely, the sound information extraction unit 104 extracts sound information from the sound information input unit 102. In this case, if the sound information input unit 102 has a component to be electrically driven, it is desired that a power supply to the sound information input unit 102 first starts when the sound information extraction unit 104 starts operating. On the other hand, if the sound information input unit 102 has not a component to be electrically driven, it is desired that the sound information extraction unit 104 does not receive sound information from the sound information input unit 102 until the sound information extraction unit 104 starts operating. The sound information extraction unit 104 inputs the sound information extracted to the feature extraction unit 105. The sound information extracted by the sound information extraction unit 104 is an analysis object of feature quantity by the feature extraction unit 105. As mentioned-above, the sound information extraction unit 104 extracts the sound information while the motion status is a still status. Accordingly, clear sound information in which mixed noises by a user's moving is few, is input to the feature extraction unit 105.

The feature extraction unit 105 extracts a feature quantity of the sound information from the sound information extraction unit 104. The feature quantity extractable by the feature extraction unit 105 is not specially limited. For example, the feature quantity may include a power spectrum of each frequency component acquired by frequency analysis (FFT (Fast Fourier Transform), wavelet Transform), and a sound quality metrics such as a loudness, a sharpness, a roughness and change quantity. Furthermore, a time of starting a feature extraction processing by the feature extraction unit 105 is arbitrary. For example, a timing when the sound information extraction unit 104 extracts sound information corresponding to a minimum data quantity necessary to extract the feature quantity is the start timing. A completion timing of feature extraction processing by the feature extraction unit 105 is arbitrary. For example, a timing when the still state is completed (Briefly, completion of sound information extraction processing by the sound information extraction unit 104), a timing when decision processing of the context decision unit 108 is completed at a decision mode (explained afterwards), a timing when input processing of the context input unit 107 is completed at a training mode (explained afterwards), are the completion timing. The feature extraction unit 105 executes feature quantity extraction processing at a predetermined interval between the start timing and the completion timing.

An operation mode of the context recognition apparatus 100 includes at least a training mode and a decision mode. The training mode is an operation mode to generate an identification model (explained afterwards) and store the model into the identification model storage unit 110. The decision mode is an operation mode to decide the present context by comparing the feature quantity (extracted by the feature extraction unit 105) with identification models stored at the training mode. At the training mode, when the feature extraction unit 105 extracts a feature quantity, the feature extraction unit 105 makes the identification model storage unit 110 store the feature quantity (as the identification model) in correspondence with a specified context (input from the context input unit 107). On the other hand, at the decision mode, when the feature extraction unit 105 extracts a feature quantity, the feature extraction unit 105 inputs the feature quantity to the context decision unit 108.

The mode switching unit 106 switches an operation mode of the context recognition apparatus 100 between the decision mode and the training mode. A mode to realize switching of the operation mode is not specially limited. For example, a user may indicate his/her desired operation mode via an operation screen or a button of the context recognition apparatus 100.

Figure 13:
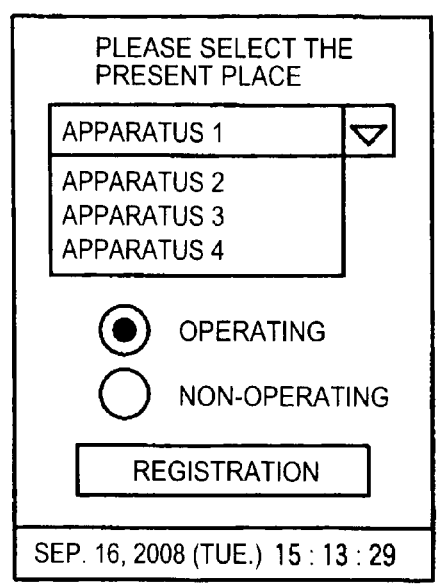
FIG. 13 is an exemplary operation display of the context recognition apparatus of FIG. 1.

At the training mode, the context input unit 107 previously inputs a specified context as a parameter of the identification model. In an example of FIG. 6, the context input unit 107 inputs information that the context recognition apparatus 100 is located adjacent to the apparatus 1. The context input unit 107 may equip a user interface shown in FIG. 13. In the interface of FIG. 13, information that the context recognition apparatus 100 is located adjacent to each apparatus 1~7 in FIG. 6 can be input as a specified context. At the training mode, a user selects a suitable apparatus with a pull-down menu. Furthermore, if sound information acquired around a particular apparatus is different while the particular apparatus is operating/not operating, in addition to location adjacent to the particular apparatus, operating/non-operating of the particular apparatus may be input as one parameter of the specified context. In this way, the specified context may be defined by not only one parameter but at least two parameters. In the interface of FIG. 13, for example, an identification model is generated by pushing a registration button displayed on an operation screen, and stored in the identification model storage unit 110.

At the decision mode, the context decision unit 108 decides a present context of the context recognition apparatus 100. Concretely, the context decision unit 108 compares a feature quantity from the feature extraction unit 105, with a feature quantity (parameter) of each identification model read from the identification model storage unit 110. The context decision unit 108 decides that a specified context corresponding to the most similar feature quantity is the present context. In this case, an index of the similarity may be arbitrarily determined. For example, if the feature quantity is a power spectrum of each frequency component, the context decision unit 108 may decide that a specified context corresponding to a power spectrum having the smallest difference between the power spectrum and an input power spectrum (from the feature extraction unit 105) are the present context. Furthermore, the context decision unit 108 may utilize a MFCC (Mel-Frequency Cepstrum Coefficient) or a HMM (Hidden Markov Model).

An operation timing of the context decision unit 108 is arbitrary. If the feature extraction unit 105 operates continuously, the context decision unit 108 may decide the present context in real time by continuously operating in parallel with the feature extraction unit 105.

The context decision unit 108 inputs a decision result to the decision result output unit 109. Moreover, the context decision unit 108 may not always decide the present context. For example, if a difference between an input feature quantity from the feature extraction unit 105 and the most similar feature quantity of the identification model is comparatively large (predetermined difference), the context decision unit 108 may input a decision result representing an error to the decision result output unit 109. Furthermore, a degree of the difference as a reference value of error decision may be determined designedly/experimentally.

The decision result output unit 109 outputs a decision result from the context decision unit 108. An output mode of the decision result is not specially limited. For example, the decision result output unit 109 displays a text or an image showing the decision result on a screen equipped with the context recognition apparatus 100, or transmits data showing the decision result to the outside (For example, a terminal set in the control house) via a communication means such as a wireless LAN. Furthermore, the decision result output unit 109 may automatically present a suitable operation screen or a speech announcement, based on the decision result from the context decision unit 108.

The identification model storage unit 110 stores an identification model to identify a specified context recognizable by the context recognition apparatus 100. As mentioned-above, at the training mode, the identification model storage unit 110 stores a specified context (input from the context input unit 107) and a corresponding feature quantity (input from the feature extraction unit 105). At the decision mode, the identification model (stored in the identification model storage unit 110) is adaptively read by the context decision unit 108.

For example, the identification model is stored as a data set shown in FIG. 14, into the identification model storage unit 110. In the data set of FIG. 14, numerical values 1 and 2 respectively represent a frequency and a power of the frequency.

Figure 5:
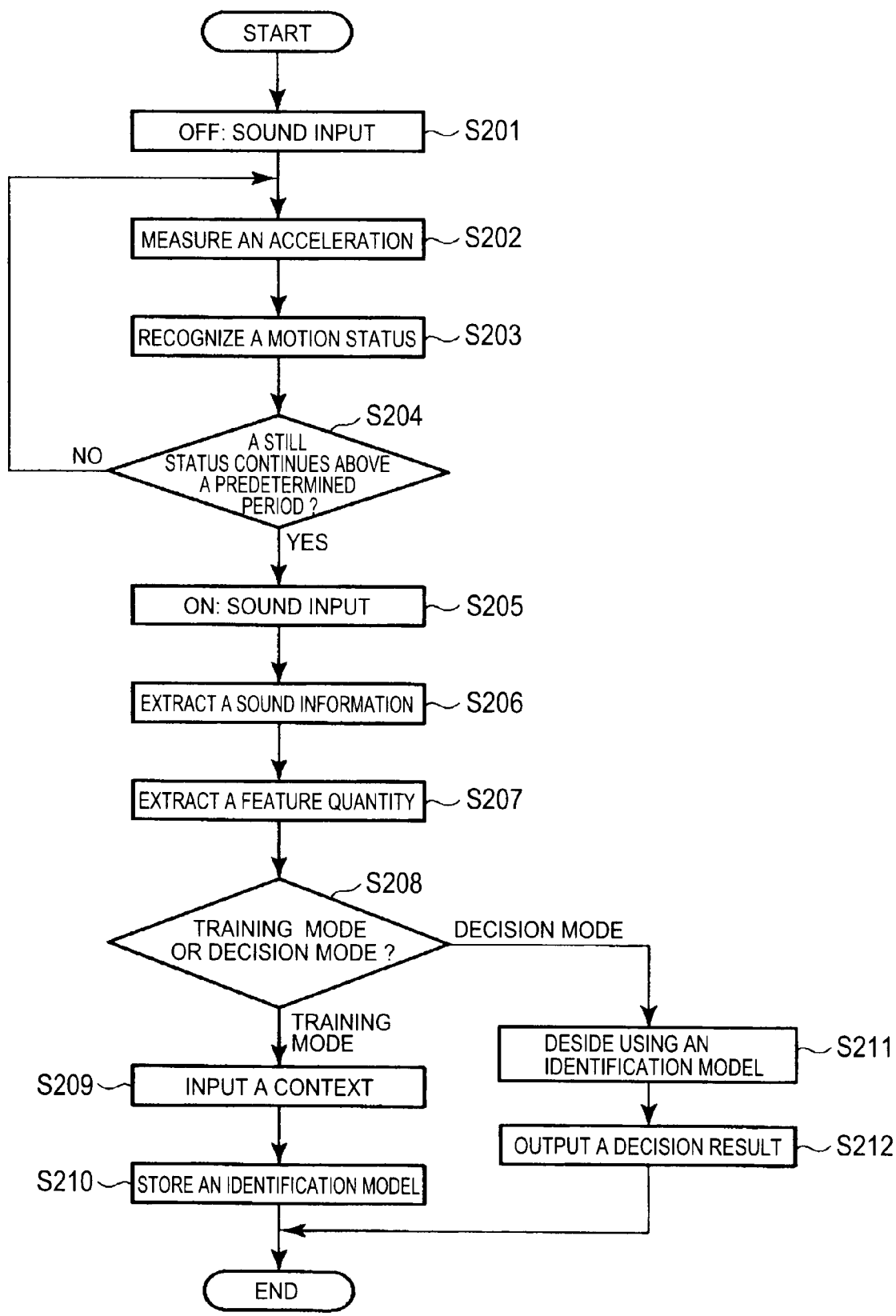
FIG. 5 is a flow chart of processing of the context recognition apparatus of FIG. 1.

Hereinafter, operation of the context recognition apparatus 100 is explained by referring to FIG. 5. First, at either of the training mode and the decision mode, the sound information extraction unit 104 sets an input of sound information (from the sound information input unit 102) to "OFF" (S201), and processing is forwarded to S202.

At S202, the moving information input unit 101 inputs moving information. Concretely, the moving information input unit 101 measures three-axis acceleration of the context recognition apparatus 100. Next, the motion status recognition unit 103 recognizes a user's motion status carrying the context recognition apparatus 100, based on the moving information extracted at S202. If a recognition result of the motion status at S203 is a still status continuing above a predetermined period, processing is forwarded to S205. If not so, processing is returned to S202 (S204).

At S205, the sound information extraction unit 104 sets an input of sound information (from the sound information input unit 102) to "ON". Next, the sound information extraction unit 104 extracts sound information input from the sound information input unit 102 (S206). Next, the feature extraction unit 105 extracts a feature quantity of the sound information extracted at S206 (S207). If an operation mode of the context recognition apparatus 100 is the training mode, processing is forwarded to S209. If the operation mode is the decision mode, processing is forwarded to S210 (S208).

The context input unit 107 inputs a specified context as a parameter of the identification model (S209). Next, in the identification model storage unit 110, a feature quantity (extracted at S207) and a corresponding specified context (input at 5209) are stored as the identification model (S210), and processing is completed.

At S211, the context decision unit 108 compares a feature quantity (extracted at S207) with each identification model read from the identification model storage unit 110, and decides the present context. Next, the decision result output unit 109 outputs a decision result acquired at S211 (S212), and processing is completed.

As mentioned-above, as to the context recognition apparatus of the first embodiment, sound information under a still status is extracted, and a context recognition is executed by analyzing a feature quantity of the sound information. Accordingly, clear sound information in which mixed noises by the user's moving is few, can be utilized as an analysis object. As a result, the user's context can be correctly recognized with low calculation quantity and low power consumption.

The Second Embodiment

Figure 15:
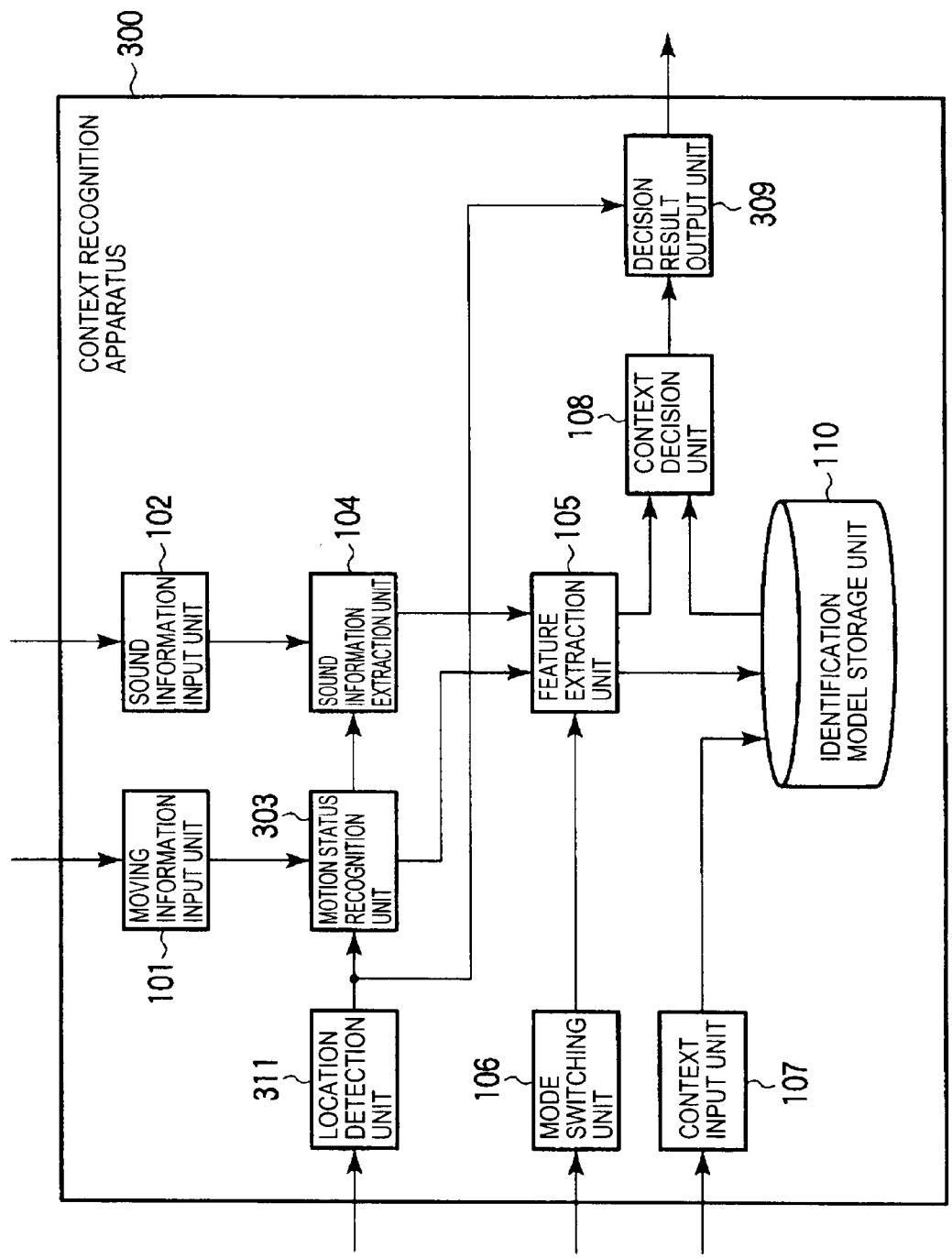
FIG. 15 is a block diagram of a context recognition apparatus according to a second embodiment.

As shown in FIG. 15, as to a context recognition apparatus 300 of the second embodiment, in comparison with the context recognition apparatus 100 of FIG. 1, the motion status recognition unit 103 and the decision result output unit 109 are respectively replaced with a motion status recognition unit 303 and a decision result output unit 309, and a location detection unit 311 is further included. In following explanation, as to the same unit as FIG. 1 in FIG. 15, the same sign reference numeral is assigned, and different units are mainly explained.

The location detection unit 311 detects location information of the context recognition apparatus 300. By using a GPS, a beacon (wireless, supersonic wave), an intensity of a wireless electric wave, or a RFID technique, the location detection unit 311 detects location information of the context recognition apparatus 300. In the following explanation, it is assumed that a location detection method used by the location detection unit 311 is GPS.

As well-known, GPS is a technique to measure a location (latitude and longitude) using satellite, and a special equipment need not be set. Briefly, GPS has a merit to lower the installation cost. Especially, a location detection using GPS outdoors is effective. Accordingly, in the context recognition apparatus 300, a location detection using GPS outdoors is periodically executed, and the same context recognition as the first embodiment is executed at a location (indoors) where the satellite cannot be viewed.

Concretely, the motion status recognition unit 303 does not operate in a period when the location detection unit 311 succeeds in detecting a location, and a location detection result by the location detection unit 311 is output via the decision result output unit 309. Moreover, the location detection result may be used for context decision processing by the context decision unit 108. For example, by correlating the location information (as a parameter of the identification model) with a specified context, the context decision unit 108 can improve a decision accuracy of the present context based on the location detection result. In this case, the location information to be correlated with the specified context may be detected at the training mode, or may be directly indicated irrespective of the training mode.

Hereinafter, an exemplary application of the location detection result by the location detection unit 311 is introduced. In a usage environment of FIG. 6, it is assumed that the location detection unit 311 can detect location information in a period that the user moves from a control house to a building A, a period that the user moves from the building A to a building B, a period that the user moves from the building B to a building C, and a period that the user returns from the building C to the control house. Accordingly, by using the latest location detection result of the location detection unit 311, identification models as comparison objects by the context decision unit 108 are selected, and a calculation quantity can be reduced. Furthermore, by heightening a priority of a specified identification model, accuracy of context recognition can be improved. Concretely, if the latest location detection result of the location detection unit 311 is adjacent to an entrance of the building A, the context decision unit 108 selects identification models of apparatuses A and B as comparison objects at the decision mode, or assigns a higher similarity to the identification models than other identification models of apparatuses 3~7.

Furthermore, by incorrectly detecting location information because of some reason, even if the latest location detection result is adjacent to an entrance of the building B, it happens that a feature quantity of identification models of apparatuses 3, 4 and 5 is largely different from a present feature quantity extracted by the feature extraction unit 105. In this case, based on the passage of time from acquisition of the latest location detection result or a route of the user's inspection operation, by estimating that the present location is inside the building C, the context decision unit 108 may add identification models of apparatuses 6 and 7 to comparison objects, or assign a higher similarity to the identification models than other identification models of apparatuses 1~5.

On the other hand, even if the passage of time from acquisition of the latest location detection result is comparatively short, it happens that a feature quantity of the identification model of an apparatus in the specified building based on the location detection result is largely different from a present feature quantity extracted by the feature extraction unit 105. In this case, a status that the user is falling down, the user's moving route is erroneous, or the apparatus outputs an unusual sound, is considered. Accordingly, the context decision unit 8 may decide that the present status is unusual.

Figure 16:
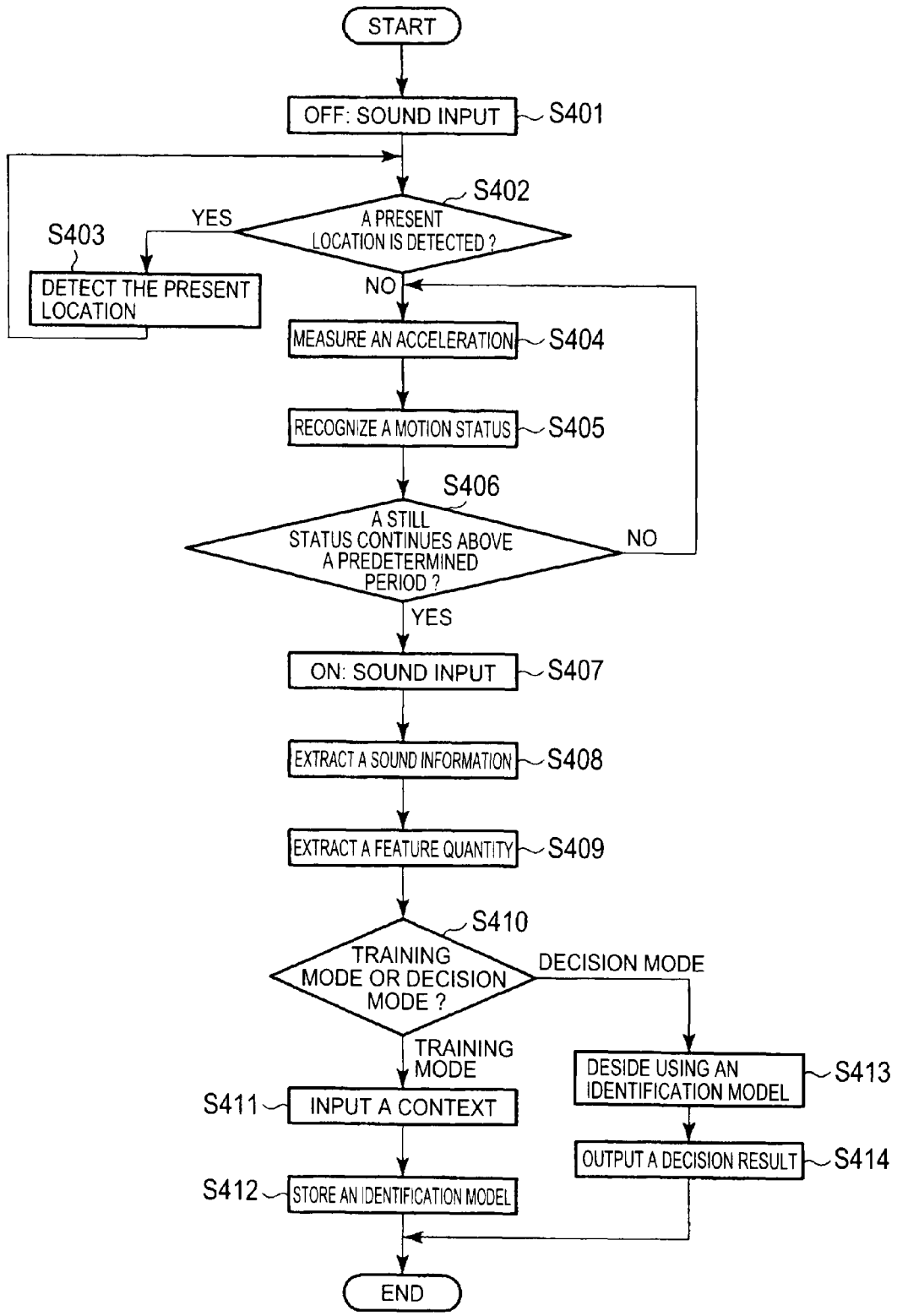
FIG. 16 is a flow chart of processing of the context recognition apparatus of FIG. 15.

Hereinafter, operation of the context recognition apparatus 300 is explained by referring to FIG. 16. First, at either of the training mode and the decision mode, the sound information extraction unit 104 sets an input of sound information (from the sound information input unit 102) to "OFF" (S401), and processing is forwarded to S402.

At S402, if the location detection unit 311 can detect location information of the context recognition apparatus 300, processing is forwarded to S403. If not so, processing is forwarded to S404. At S403, the location detection unit 311 detects a location of the context recognition apparatus 300, and processing is returned to S402.

At S404, the moving information input unit 101 inputs moving information. Concretely, the moving information input unit 101 measures three-axis acceleration of the context recognition apparatus 300. Next, the motion status recognition unit 303 recognizes a user's motion status carrying the context recognition apparatus 300, based on the moving information extracted at S404. If a recognition result of the motion status at S405 is a still status continuing above a predetermined period, processing is forwarded to S407. If not so, processing is returned to S402.

At S407, the sound information extraction unit 104 sets an input of sound information (from the sound information input unit 102) to "ON". Next, the sound information extraction unit 104 extracts sound information input from the sound information input unit 102 (S408). Next, the feature extraction unit 105 extracts a feature quantity of the sound information extracted at S408 (S409). If an operation mode of the context recognition apparatus 300 is the training mode, processing is forwarded to S411. If the operation mode is the decision mode, processing is forwarded to S412 (S410).

The context input unit 107 inputs a specified context as a parameter of the identification model (S411). Next, in the identification model storage unit 110, a feature quantity (extracted at S409) and a corresponding specified context (input at S411) are stored as the identification model (S412), and processing is completed.

At S413, the context decision unit 108 compares a feature quantity (extracted at S409) with each identification model read from the identification model storage unit 110, and decides the present context. Next, the decision result output unit 109 outputs a decision result acquired at S413 (S414), and processing is completed.

As mentioned-above, as to the context recognition apparatus of the second embodiment, the context recognition is executed using not only the sound information but also the location detection result. Accordingly, clear sound information in which mixed noises by the user's moving is few, can be utilized as an analysis object. As a result, in comparison with the context recognition apparatus of the first embodiment, the user's context can be recognized with lower calculation quantity and higher accuracy.

Moreover, in the second embodiment, a height detection unit to detect a height based on a specified location may be further prepared. For example, in case of utilizing an atmospheric pressure sensor, by setting an atmospheric pressure of an exit of the control house at start timing of inspection operation to a reference value, a relative height can be detected. By preparing the height detection unit, not only a plane location but also a height (floor in the building) can be utilized. Accordingly, a calculation quantity of the context recognition apparatus of the second embodiment is further reduced, and accuracy of context recognition can be further improved. Furthermore, a moving time from some status (For example, location adjacent to the apparatus 1) to another status (For example, location adjacent to the apparatus 2), moving information such as the number of steps, or a motion recognition result (For example, transition of the motion status), may be utilized for content decision.

The Third Embodiment

Figure 17:
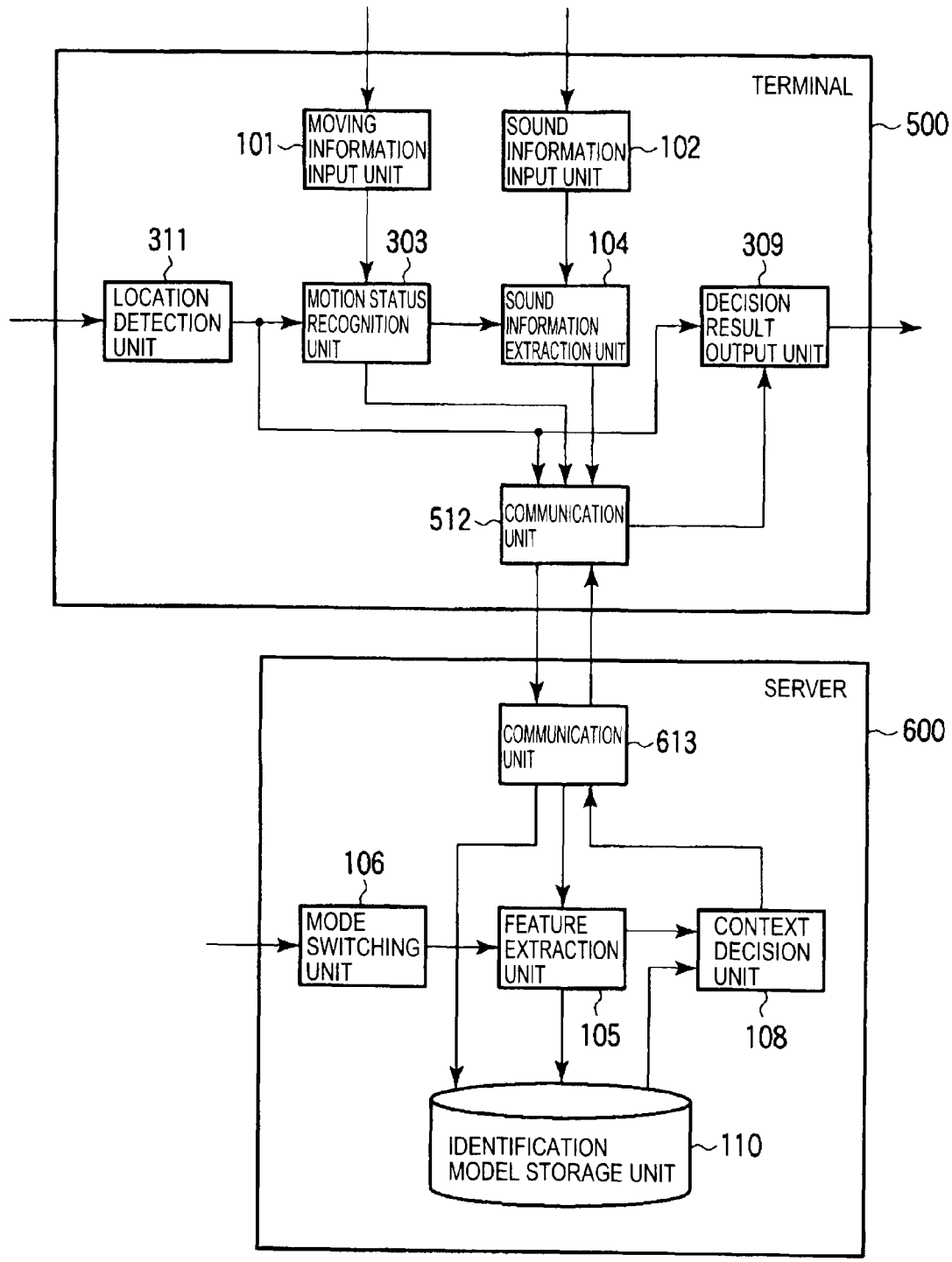
FIG. 17 is a block diagram of a context recognition apparatus according to a third embodiment.

As shown in FIG. 17, a context recognition system of the third embodiment is composed by a terminal 500 and a server 600. In following explanation, as to the same unit as FIG. 15 in FIG. 17, the same reference numeral is assigned, and different units are mainly explained.

The terminal 500 includes the moving information input unit 101, the sound information input unit 102, the motion status recognition unit 303, the sound information extraction unit 104, the decision result output unit 309, the location detection unit 311, and a communication unit 512. The terminal 500 is carried with a user, in the same way as the context recognition apparatus 100 and the context recognition apparatus 300. The server 600 includes the feature extraction unit 105, the mode switching unit 106, the context decision unit 108, the identification model storage unit 110, and a communication unit 613. A wireless communication is suitably executed between the terminal 500 and the server 600 via the communication units 512 and 613.

As mentioned-above, as to the context recognition system of the third embodiment, the terminal extracts the moving information, the sound information and the location information, and the server executes context recognition processing. Briefly, the context recognition processing having a large load of power consumption and calculation quantity is executed by the server. Accordingly, an operation processing ability and a buttery ability required for the terminal to be carried with the user can be lowered.

In the disclosed embodiments, the processing can be performed by a computer program stored in a computer-readable medium.

In the embodiments, the computer readable medium may be, for example, a magnetic disk, a flexible disk, a hard disk, an optical disk (e.g., CD-ROM, CD-R, DVD), an optical magnetic disk (e.g., MD). However, any computer readable medium, which is configured to store a computer program for causing a computer to perform the processing described above, may be used.

Furthermore, based on an indication of the program installed from the memory device to the computer, OS (operation system) operating on the computer, or MW (middle ware software), such as database management software or network, may execute one part of each processing to realize the embodiments.

Furthermore, the memory device is not limited to a device independent from the computer. By downloading a program transmitted through a LAN or the Internet, a memory device in which the program is stored is included. Furthermore, the memory device is not limited to one. In the case that the processing of the embodiments is executed by a plurality of memory devices, a plurality of memory devices may be included in the memory device.

A computer may execute each processing stage of the embodiments according to the program stored in the memory device. The computer may be one apparatus such as a personal computer or a system in which a plurality of processing apparatuses are connected through a network. Furthermore, the computer is not limited to a personal computer. Those skilled in the art will appreciate that a computer includes a processing unit in an information processor, a microcomputer, and so on. In short, the equipment and the apparatus that can execute the functions in embodiments using the program are generally called the computer.

Other embodiments of the invention will be apparent to those skilled in the art from consideration of the specification and embodiments of the invention disclosed herein. It is intended that the specification and embodiments be considered as exemplary only, with the scope and spirit of the invention being indicated by the claims.

What is claimed is:

1. An apparatus for recognizing a context of an object, comprising:
   a first input unit configured to input moving information of an object;
   a second input unit configured to input first sound information around the object;
   a recognition unit configured to recognize a motion status of the object based on the moving information;
   a first extraction unit configured to selectively extract second sound information from the first sound information, based on the motion status;
   a second extraction unit configured to extract a first feature quantity from the second sound information;
   a storage unit configured to store a plurality of models, each model having a second feature quantity and a corresponding specified context, the second feature quantity being extracted by the second extraction unit before the first feature quantity is extracted;
   a decision unit configured to decide that the specified context corresponding to the second feature quantity most similar to the first feature quantity is a present context of the object;
   an output unit configured to output the present context;
   a switching unit configured to switch between a first mode and a second mode; and
   a third input unit configured to input the specified context in the second mode;
   wherein the second extraction unit,
   in the first mode, extracts the first feature quantity, and
   in the second mode, extracts the second feature quantity, and stores the second feature quantity and the corresponding specified context into the storage unit,
   wherein at least one part of the specific context is defined by a parameter representing that the object is located adjacent to a particular apparatus.

2. The apparatus according to claim 1,
   wherein the at least one part of the specific context is defined by the parameter and another parameter representing that the particular apparatus is operating or non-operating.

3. The apparatus according to claim 2, wherein
   the model has the second feature quantity, the specified context, and the motion status recognized by the recognition unit until the specified context is input by the third input unit.

4. The apparatus according to claim 1, wherein
   the second extraction unit starts to extract the first feature quantity at a timing when the first extraction unit has extracted the second sound information corresponding to the minimum quantity necessary to extract the first feature quantity.

5. The apparatus according to claim 1, further comprising
   a location detection unit configured to detect location information of the object;
   wherein the model has the second feature quantity, the specified context, and the location information detected before the second feature quantity is extracted.

6. The apparatus according to claim 5, wherein
   the location information is detected at the latest timing, before the second feature quantity is extracted.

7. The apparatus according to claim 5, wherein
the decision unit selects at least one candidate from the plurality of models, based on the location information detected at the latest timing by the location detection unit, and, when the first feature quantity is not similar to the second feature quantity included in the at least one candidate, decides that the present context is unusual.

8. The apparatus according to claim 1, further comprising:
a height detection unit configured to detect height information of the object;
wherein the model has the second feature quantity, the specified context, and the height information detected at the latest timing before the second feature quantity is detected.

9. A method for recognizing a context of an object, comprising:
inputting moving information of an object;
inputting first sound information around the object;
recognizing a motion status of the object based on the moving information;
selectively extracting second sound information from the first sound information, based on the motion status;
extracting a first feature quantity from the second sound information;
storing a plurality of models in a memory, each model having a second feature quantity and a corresponding specified context, the second feature quantity being extracted before extracting the first feature quantity;
deciding that the specified context corresponding to the second feature quantity most similar to the first feature quantity is a present context of the object;
outputting the present context;
switching between a first mode and a second mode; and
inputting the specified context in the second mode;
wherein the extracting includes,
in the first mode, extracting the first feature quantity, and
in the second mode, extracting the second feature quantity, and storing the second feature quantity and the corresponding specified context into the memory,
wherein at least one part of the specific context is defined as a parameter representing that the object is located adjacent to a particular apparatus.

* * * * *